United States Patent
Yeung et al.

(10) Patent No.: US 12,545,322 B2
(45) Date of Patent: Feb. 10, 2026

(54) VISION BASED HITCH DOCKING

(71) Applicant: Rivian IP Holdings, LLC, Irvine, CA (US)

(72) Inventors: Fai Yeung, Palo Alto, CA (US); Krishnan Abhiram, Surrey (CA)

(73) Assignee: Rivian IP Holdings, LLC, Irvine, CA (US)

( * ) Notice: Subject to any disclaimer, the term of this patent is extended or adjusted under 35 U.S.C. 154(b) by 89 days.

(21) Appl. No.: 18/501,201

(22) Filed: Nov. 3, 2023

(65) Prior Publication Data

US 2025/0145215 A1    May 8, 2025

(51) Int. Cl.
*B62D 15/02* (2006.01)
*G06T 7/70* (2017.01)
*G06V 20/58* (2022.01)

(52) U.S. Cl.
CPC .............. *B62D 15/025* (2013.01); *G06T 7/70* (2017.01); *G06V 20/58* (2022.01); *G06T 2207/30261* (2013.01)

(58) Field of Classification Search
CPC ......... B62D 15/025; B60D 1/06; B60D 1/242
See application file for complete search history.

(56) References Cited

U.S. PATENT DOCUMENTS

| | | | | |
|---|---|---|---|---|
| 10,780,752 | B1* | 9/2020 | Niewiadomski | B60D 1/06 |
| 10,933,914 | B2* | 3/2021 | Dottavio | B60D 1/06 |
| 2019/0217831 | A1* | 7/2019 | Viele | B60D 1/245 |
| 2020/0023696 | A1* | 1/2020 | Ling | B60R 1/26 |
| 2020/0086702 | A1* | 3/2020 | Ling | B62D 1/00 |
| 2020/0148257 | A1* | 5/2020 | Niewiadomski | B62D 13/06 |
| 2021/0078374 | A1* | 3/2021 | Niewiadomski | B60D 1/04 |
| 2021/0114521 | A1* | 4/2021 | Niewiadomski | G05D 1/0231 |
| 2021/0206213 | A1* | 7/2021 | Matsushita | B60R 11/04 |
| 2021/0235019 | A1* | 7/2021 | Tonkin | H04N 23/56 |
| 2021/0291832 | A1* | 9/2021 | Simmons | B60K 35/28 |
| 2021/0365034 | A1* | 11/2021 | Delizo | B60W 10/04 |
| 2023/0132205 | A1* | 4/2023 | Strand | B60D 1/155 |

\* cited by examiner

*Primary Examiner* — Long T Tran
(74) *Attorney, Agent, or Firm* — Foley & Lardner LLP

(57) ABSTRACT

Described herein are gaming systems and methods for providing all-in card games. A data processing system can receive a wager and generate a graphical user interface having a player hand and a graphical element indicating a set of player and opponent gaming resources, with the set of opponent gaming resources outnumbering the player gaming resources. The graphical user interface includes a set of interactive graphical elements that update the game state. The set of interactive graphical elements consists only of a first element that stakes all the player gaming resources and a second element that indicates a fold. The data processing system can determine an updated game state responsive to an interaction with the first or second interactive element. The data processing system can initiate a subsequent play responsive to determining that the set of player and opponent gaming resources is greater than zero.

20 Claims, 11 Drawing Sheets

900

905
Detect a location of a coupling receiver of a towed assembly to interface with a coupling member of a vehicle based on image data associated with a camera of the vehicle

910
Present the location via an interface

915
Receive a confirmation of the location from the user interface

920
Generate a control signal based on the confirmation, to adjust a position of the coupling member

FIG. 9

VISION BASED HITCH DOCKING

INTRODUCTION

Vehicles can include a coupling member (e.g., ball hitch) to couple with a coupling receiver (e.g., trailer coupler) of a towed assembly (e.g., trailer). The vehicle can maneuver towards the coupling receiver to couple therewith.

SUMMARY

This disclosure relates to systems and methods for hitch-docking, as between an electric vehicle and a trailer. The systems can employ sensors, such as time-of-flight sensors or cameras, to detect the location of the coupling receiver or obstacle in a path thereto, or to generate image data representing the coupling receiver. These sensors can differentiate between coupling receivers and other objects. The sensors can recognize signals from vehicle controls or external devices, like mobile phones or gestures from users, indicating where the coupling receiver is located or where the vehicle should maneuver to reach the coupling receiver. A user can provide input based on an observation of a coupling member of the vehicle in relation to the towed assembly. For example, the user can directly observe the vehicle in relation to the towed assembly, or receive image data indicating a spatial relationship therebetween (e.g., exterior to or within the vehicle cabin). The user can confirm, halt, or adjust the hitching operation through gestures or selections on various user interfaces, including graphical user interfaces of a mobile device or vehicle, from key fobs, bracelets/smart bands, or though gestures received by vehicle sensors. The system can maneuver the vehicle towards the towable assembly, making adjustments for steering, propulsion, or suspension height to align a coupling member of the vehicle with the coupling receiver of the towable assembly.

At least one aspect is directed to a method. The method can be performed by one or more processors, such as one or more processors of a data processing system. The method can include detecting a location of a coupling receiver of a towed assembly configured to interface with a coupling member of a vehicle, the location based on image data associated with a camera of the vehicle. The method can include presenting, by the one or more processors, the location via an interface. The method can include receiving from the interface, a confirmation of the location. The method can include generating a control signal based on the confirmation, the control signal to adjust a position of the coupling member.

At least one aspect is directed to a system. The system can include a computing system comprising one or more processors, coupled with memory to. The one or more processors can detect a location of a coupling receiver of a towed assembly configured to interface with a coupling member of a vehicle, the location based on image data associated with a camera of the vehicle. The one or more processors can present the location via an interface. The one or more processors can receive, from the interface, a confirmation of the location. The one or more processors can generate a control signal based on the confirmation, the control signal to adjust a position of the coupling member.

At least one aspect is directed to an electric vehicle. The electric vehicle can include a coupling member. The electric vehicle can include a propulsion system configured to adjust a position, and height of the coupling member. The electric vehicle can include a computing system comprising one or more processors, coupled with memory. The computing system can detect a location of a coupling receiver of a towed assembly configured to interface with a coupling member of a vehicle, the location based on image data associated with a camera of the vehicle. The computing system can present the location via an interface. The computing system can receive, from the interface, a confirmation of the location. The computing system can generate a plurality of control signals to adjust a position of the coupling member based on the confirmation. The control signals can include a first control signal to adjust a height of the coupling member. The control signals can include a second control signal to adjust a steering angle of the vehicle. The control signals can include a third control signal to propel the vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 9 depicts a flow chart for a method of vision based hitch docking, according to some embodiments.

DETAILED DESCRIPTION

Following below are more detailed descriptions of various concepts related to, and implementations of, methods, apparatuses, and systems of vision based hitch docking. The various concepts introduced above and discussed in greater detail below may be implemented in any of numerous ways.

This disclosure is generally directed to systems and methods for hitch-docking between, for example, an electric vehicle and a trailer. Hitch docking can refer to coupling the vehicle to the trailer via a ball mount or other coupling member and a hitch receiver, or other coupling receiver. The system can include sensors to detect an indication of a location of a coupling receiver, such as a hitch receiver of a trailer. For example, the sensors can include time-of-flight sensors such as ultrasonics, or vision system sensors (e.g., cameras) to detect the coupling receiver. Such systems can further segment and classify an object, to discriminate between coupling receivers and other objects. The indication can include a message received by the system, such as a message from a mobile device of a user external to the vehicle (e.g., via a message sent electronically by a cellular phone, key fob, or bracelet). The indication can include a presence or gesture of a user detected by vehicle sensors, such as a vision system thereof. Such gestures can include identity-related gestures (e.g., gesture passwords) or operation-related gestures (e.g., instructions to couple to a trailer, or to otherwise adjust a vehicle position).

The system can present an indication of the detection, by providing the indication to a user interface, such as a display of the location of the hitch on a center information display (CID) of the vehicle, a screen of a mobile device, or a haptic notification of mobile device. The user can confirm the received indication, such as according to a gesture or an explicit selection of a user interface element presented via a display (e.g., via a touchscreen corresponding to the display). In some instance, the user can halt, cancel, or adjust an operation, such as according to another gesture, by a presence, or by a selection of a user interface element.

The system can cause the vehicle to move towards a hitch receiver, by generating steering, propulsive, or suspension adjustment controls. For example, the system can steer the vehicle towards the hitch or adjust a height of the suspension to avoid a collision with a trailer. The vehicle can propel the vehicle to laterally align the vehicle with the hitch, and can raise the suspension to couple the vehicle to the trailer. The system can be operated by one or more users, any of which can occupy or be external to the vehicle.

Figure 1:
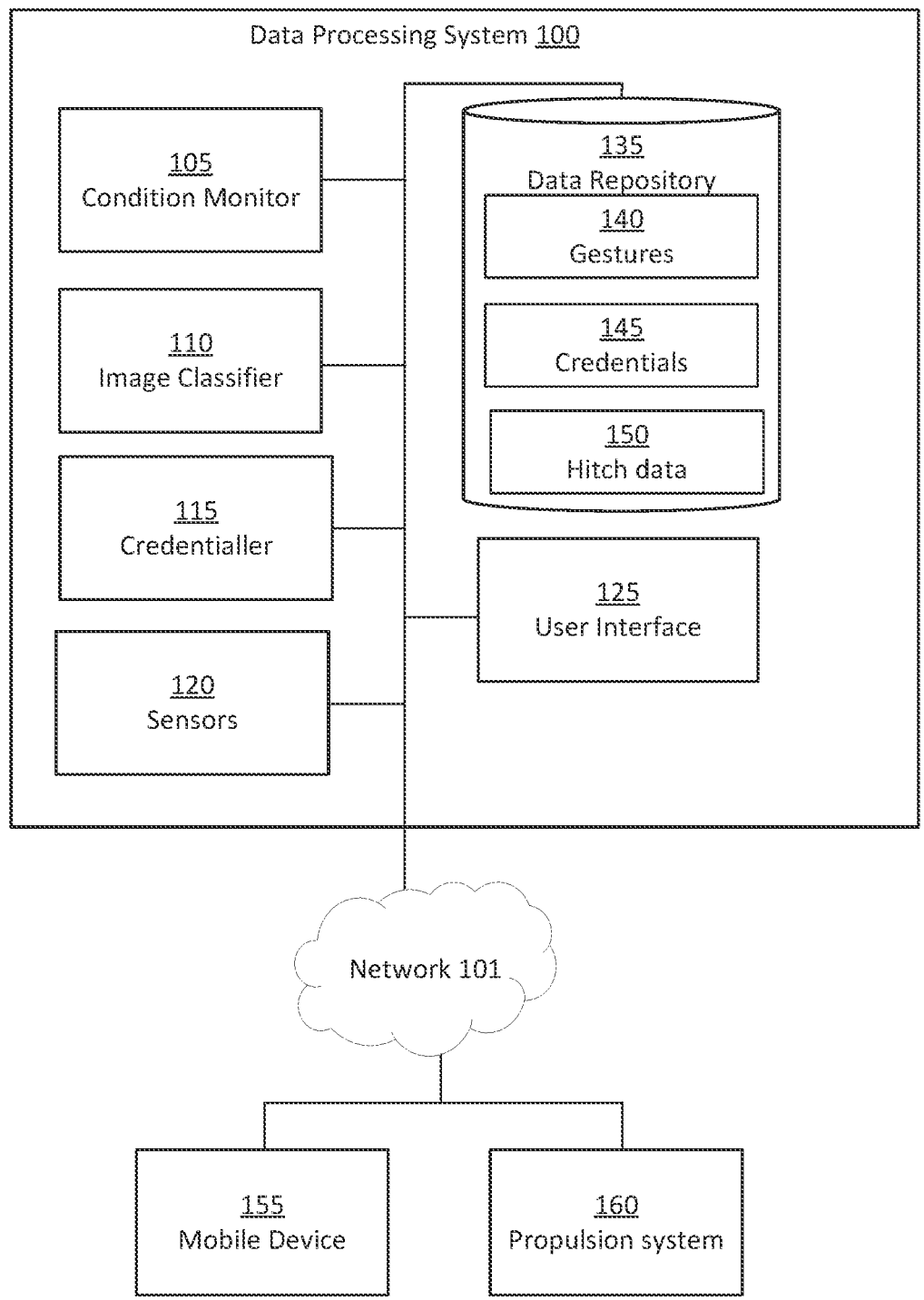
FIG. 1 depicts a system to couple a vehicle with a towed assembly, in accordance with some aspects.

FIG. 1 depicts a system to couple a vehicle with a towed assembly, in accordance with some aspects. The system can include, interface with, or otherwise communicate with data processing system 100 for a vehicle, such as an electric vehicle. The data processing system 100 can employ a network 101 to exchange information with other portions of the electric vehicle or devices exterior thereto. For example, the data processing system 100 can communicatively couple to a device associated with the electric vehicle such as a mobile device 155, or other portions of the vehicle, such as a propulsion system 160 configured to propel the vehicle. The network 101 can include computer networks such as Ethernet networks, controller area networks 101 (CAN), local interconnect networks 101 (LIN), Peripheral Component Interconnect Express (PCIe), the Internet, local, wide, metro, or other area networks 101, intranets, cellular networks 101, satellite networks 101, and other communication networks 101 such as Bluetooth, or data mobile telephone networks 101. The network 101 can be public or private. The various elements of the data processing system 100 can communicate over the network 101.

The data processing system 100 can include or be part of (e.g., hosted by) a vehicle. The data processing system 100 can include or interface with at least one condition monitor 105 to determine a condition of a vehicle control or environment. The data processing system 100 can include or interface with at least one image classifier 110 to classify an image, such as to classify a coupling receiver or body gesture 140. The data processing system 100 can include or interface with at least one credentialer 115 configured to establish an identity of a user. The data processing system 100 can include or interface with at least one sensor 120 to detect information associated with an environment, such as a location of a trailer or other towed assembly, or an obstacle. The data processing system 100 can include or interface with at least one interface including a user interface 125, such as a graphical user interface 125 of a mobile device, or a vehicle display, such as a center information display (CID).

The data processing system 100 can include at least one data repository 135. The condition monitor 105, image classifier 110, credentialer 115, sensor 120, or user interface 125 can each include at least one processing unit or other logic device such as programmable logic array engine, or module configured to communicate with the data repository 135 or database. The condition monitor 105, image classifier 110, credentialer 115, sensor 120, or user interface 125 can be separate components, a single component, or part of the data processing system 100. The data processing system 100 can include hardware elements, such as one or more processors, logic devices, or circuits. For example, the data processing system 100 can include one or more components or structures of functionality of computing devices depicted in FIG. 10 or FIG. 11.

The data repository 135 can include one or more local or distributed databases, and can include a database management system. The data repository 135 can include computer data storage or memory and can store one or more data structures, such as a gesture 140, credential 145 or other indication of an identity, or hitch data 150.

A gesture 140 (e.g., body gesture 140) can refer to or include a movement, a pose, or a sequence thereof. For example, the gesture 140 can include poses (e.g., a number of fingers presented), an arm position, etc. The gestures 140 can include a movement (e.g., a hand or arm movement providing an arm outward, and another arm in a direction to indicate motion in that direction). The movement can mimic a vehicle control, such as a rotation of a steering wheel. Some movements can correspond to numbers or letters, such as by tracing an outline of a letter or number or providing a depiction thereof. A gesture 140 can provide a password or an instruction, such as an instruction to begin, pause, or halt any of the various operations described herein.

A credential 145 can refer to or include an indication of identity, such as an electronic token, gesture 140, or physical token. A credential 145 can be provided via a gesture 140, such as a number of fingers presented, a traced outline of a letter or number, a sequence thereof, or another pose. A credential 145 can include a token provided by an electronic device (e.g., mobile device 155), such as a key fob, bracelet, or mobile phone. The token can be conveyed via an electronic message between a device remote from a vehicle or from a user in a cabin of the vehicle. An identity can vary according to a credential 145. For example one or more wireless devices (e.g., a valet key fob) can be associated with a separate identity, relative to a mobile device or other key fob. Some credentials 145 can include a combination of one or more credential types. For example a credential 145 can be provided by a wireless device, such a mobile phone or bracelet, in combination with a body gesture 140, such as a gesture sequence.

Hitch data 150 can refer to or include information associated with a coupling member or a coupling receiver. For example, the hitch data 150 can refer to or include a height, weight, identity, or classification data. The classification data can include images, models, or other data structures corresponding to one or more hitch receivers, which may be ingested in a machine learning model trained to detect a presence or identity of a hitch receiver or coupling member. For example, the classification data can be configured to classify one or more hitch receivers according to a coupling type (e.g., ball size), lateral location, height, or other indication. Further hitch data 150 can include predefined or variable data associated with a vehicle. For example, a location of a hitch receiver of a vehicle can be predefined, and a location of a coupling member can vary according to an installed coupling member. The hitch data 150 can include a calibrated location of the coupling member (e.g., a drop or rise between a hitch receiver and a location of a ball or other coupling member). For example, the hitch data 150 can receive adjustments based on a detection of a coupling member (e.g., automatically, based on sensor data, or based on a user input).

The data processing system 100 can include or interface with one or more condition monitors 105 for a vehicle. The condition monitor 105 can detect one or more conditions associated with vision based hitch docking. For example, the condition monitor 105 can detect a position of a handbrake or gear selection (e.g., forward, reverse, or park). That is, the condition monitor 105 can detect a selected direction of travel for the vehicle. The condition monitor 105 can detect a condition associated with vehicle occupancy, such as a vehicle weight sensor, seatbelt, door position, interaction with a user interface 125 such as a center informational display (CID) disposed within the vehicle cabin.

The condition monitor 105 can detect an obstruction condition, such as a presence of a fixed or mobile obstacle. For example, the condition monitor 105 can receive sensor data from one or more sensors 120 indicating a physical obstruction, or a sensor obstruction (e.g., an obstructed view of a camera, ultrasonics, LiDAR, radar, or other sensor 120). The obstruction (also referred to as an obstacle) 120 can include another vehicle, a person, lens blemish, or so forth. Various detections based on sensor data may be referred to as performed with or by the condition monitor 105 or the sensors 120, without limiting effect.

The condition monitor 105 can detect a presence or condition associated with a remote user, such as based on a received signal strength indicator (RSSI), visual indication, or other sensor 120 input of the data processing system 100. For example, the condition monitor 105 can compare an RSSI to a threshold. Based on the comparison, the condition monitor 105 can determine that a mobile device associated with a user is withing a cabin, proximal to the vehicle wherein the data processing system 100 can inhibit propulsion, distant from the vehicle, wherein the data processing system 100 can inhibit propulsion, or otherwise disposed. A graphical depiction of an example of a location proximal to a vehicle is provided at FIG. 4.

The condition monitor 105 can determine whether a vehicle condition is compatible with propulsion based on the various conditions monitored by the condition monitor 105. For example, the condition monitor 105 can compare a position of a gear selector lever to a desired direction of travel, an occupancy of a cabin to a predefined state (e.g., occupied or unoccupied), and determine whether an obstacle is disposed so as to block vehicle travel in a desired direction or along a desired path. The condition monitor 105 can provide an indication of a condition, via a user interface 125. For example, the condition monitor 105 can provide an indication that a vehicle is in a condition associated with propulsion, or an indication of a condition preventing propulsion.

The data processing system 100 can include or interface with one or more image classifiers 110 for a vehicle. The image classifier 110 can receive image data from a sensor 120, such as a camera, and perform various operations based on the received image data. The image classifier 110 can classify a body gesture 140 or coupling receiver according to an identity or position thereof. Referring now to body gestures 140, an image classifier 110 can detect one or more key points of a body. For example, key points can include fingertips, elbow joints, a head or neck, wrists, a torso, or other body portions. Some image classifiers 110 can be instantiated on a body-part basis, such as per-arm, per-hand, or so forth. The image classifiers 110 can ingest the key points into a deep learning model (e.g., a convolutional neural net). For example, an indication of a location or relative location of the key points can be ingested as data points, or an image (e.g., visible spectrum image, Ultrasonic or LiDAR resolved image, or other image) including the key points (e.g., a representation of an elbow) can be ingested by the model. That is, the image classifiers 110 can extract key points to classify a gesture 140 based thereupon, or can determine the gestures 140 according to a graphical input (e.g., an end-to-end system).

An image classifiers 110 can include a time invariant model to classify a static gesture 140, or to classify a dynamic or series gesture 140 according to a series of images. An image classifier 110 can include a time-variant chain of blocks (e.g., a residual neural network (RNN), long short term memory network (LSTM), or the like). The time-variant components of the image classifier 110 can determine a gesture 140 including movement or a sequence (e.g., according to a residual portion thereof). The image classifiers 110 can detect (e.g., match) a gesture 140 to an identity or an instruction, whereupon various control signals can correspond to the gesture 140. The detection can include a comparison to a predefined or variable threshold.

Referring now to coupling receivers, an image classifier 110 can classify an object as including a trailer hitch according to one on or more models, or a combination thereof (e.g., an ensemble model). The image classifier 110 can detect a location of a coupling receiver of a towed assembly. The image classifiers 110 can employ edge or contour detection to classify a shape corresponding to one or more predefined threshold (e.g., distances) to identify a coupling receiver. A location of the coupling receiver can depend on the identity (e.g., classification thereof). For example, an image classifier 110 configured to determine a location of a lunette ring may determine a different location or existence relative to an image classifier 110 configured to determine a location of a ball coupler.

The image classifier 110 can employ a machine learning model to classify an image to determine a presence of a coupling receiver. The image classifier 110 can provide a binary classification (e.g., a presence or absence of a coupling receiver), or include various classes corresponding to various towable assemblies or coupling receivers. For example, the image classifier 110 can classify a lunette ring, ball coupler, or gooseneck hitch (e.g., the image classifier

110 can detect a coupling receiver configured to interface with a coupling member of the vehicle).

The image classifiers 110 can include an image segmenter to segment a coupling receiver. For example, the image classifiers 110 can include a convolutional network (e.g., a fully convolutional network (FCN)) to define multiple layers corresponding to objects (e.g., the coupling receiver, the towable assembly, or a surrounding environment). The segmenter can include a U-net, mask R-CNN, or other segmentation model.

The data processing system 100 can include or interface with one or more credentialers 115 for a vehicle. The credentialer 115 can determine an identity of an occupant of the vehicle, a user disposed exterior to the vehicle, or a presence of a physical token within the vehicle cabin or otherwise in proximity to the vehicle. For example, the credentialer 115 can receive a message including a token from an mobile device 155 exterior to the vehicle. The credentialer 115 can receive, from a sensor 120, an indication of a wireless signal. The sensor 120 can provide an indication of an RSSI, which may be indicative of a presence of the physical token within a cabin of the vehicle or within a predefined distance from the vehicle. The credentialer 115 can compare the RSSI to a threshold to determine a distance. The credentialer 115 can credential (e.g., authorize or identify) a user based on a content of a received message.

The credentialer 115 can credential a user identity according to a gesture 140. For example, the credentialer 115 can receive a static or dynamic body pose, including a position thereof. The credentialer 115 can determine a distance of the user based on an image received from a sensor 120, or an electronic message. The credentialer 115 can credential a user based on a distance of the user, a distance of an electronic device, an electronic message received from the electronic device, or a body gesture 140 received from the user. For example, the credentialer 115 can compare a distance of the user or the electronic device to a threshold (e.g., a predefined threshold for a distance to the device or user, or a distance between the device and the user). The credentialer 115 can compare a content of a token (e.g., from an electronic message or a body gesture 140) to a reference value stored by the data processing system in a data repository 135. The credentialer 115 can determine, based on the distance and the token, an identity of a user. The credentialer 115 can provide an indication of the identity to other components of the data processing system, 100, such as the user interface 125 wherein the user interface 125 can receive or execute instructions (e.g., instructions relating to a propulsion system 160) based on the credential. For example, the credentialer 115 can be operatively coupled to a propulsion system 160 such that control signals generated for the propulsion system 160 can be based on or responsive to information received by the credentialer 115.

The data processing system 100 can include or interface with one or more vehicle sensors 120 configured to sense information associated with an operation of a vehicle or an environment interacting therewith, including an indication of a presence of a user exterior to the vehicle (e.g., a gesture 140 or electronic message). For example, the vehicle sensors 120 can include a camera monitoring a coupling member in a field of view (e.g., a rear view camera). The camera can sense a visible spectrum or other image of the coupling member of the vehicle in relation to a coupling receiver of the towed assembly. The camera can detect a body gesture 140. The camera can detect an obstacle (e.g., a person, rock, wall, etc.) associated with a path of travel of the vehicle, or otherwise inspect a path of travel (e.g., to determine an absence of a detectable obstacle). The camera can provide the image to one or more displays of a user interface 125 (e.g., a vehicle CID or a mobile device). The data processing system 100 can gate, or otherwise generate control signals based on an inspection of the path of travel (e.g., halt, pause, navigate to avoid the obstacle). The data processing system 100 can associate a path of travel with an adjustment to a position of the coupling member (e.g., determine a path of travel to laterally align the coupling member with the coupling receiver).

The sensors 120 can include ultrasonic emitter/receiver pairs, LiDAR, or other time of flight (ToF) sensors 120. The ToF sensor 120 can detect a body gesture 140. The ToF sensor 120 can generate image data. The ToF sensor 120 can detect an obstacle along a path of travel. The data processing system 100 can detect an obstacle or gesture 140 according to one or more sensors 120 (e.g., an obstacle detected by either of the ToF sensor 120 or the camera can cause the data processing system 100 to generate control signals to cause the propulsion system 160 to halt the vehicle).

The sensors 120 can include sensors 120 associated with the propulsion system 160, such as the a steering angle sensor 120, or sensors 120 of the condition monitor 105. For example, the sensors 120 can provide an indication of a gear selector position, a steering angle, or an indication of an obstacle to the user interface 125.

The sensors 120 can include transceivers to detect wireless transmissions. For example, a transceiver can detect a message from an electronic device, one or more transceivers can detect a relative position of a source of a message (e.g., according to a time delay, RSSI difference, or so forth). A transceiver can receive an radio frequency (RF) signal. For example, the RF signal can be modulated according to an amplitude shift keying (ASK) or frequency shift keying (FSK), a fixed or single frequency, a unidirectional communication, or rolling codes. The RF signal can include Bluetooth, Wi-Fi, or other communications protocols. The transceivers can receive an indication of digital content of a message (e.g., a token or instruction). The transceivers can receive an indication of a location of a source of the message (e.g., RSSI, phase shift, or so forth).

The data processing interface can include or interface with one or more user interfaces 125. The user interface 125 can be designed, constructed, or operational to interface with a user, such as an occupant of an electric vehicle or a user disposed exterior to the vehicle. The user interface 125 can be integral to the vehicle, or include or be instantiated by a mobile device 155 such as a mobile phone, bracelet, or key fob. The user interface 125 can present information, such as sensor data (e.g., image data from a camera) which can include a location of a towable assembly (e.g., a coupling receiver thereof). The information may be conveyed according to a graphical user interface 125 (GUI), an LED, a haptic cue, an audible cue, vehicle components (e.g., lights, horns, etc.). For example, prompts or notification can be presented as haptic cues to a bracelet, or a push notification to a mobile device 155.

The GUI can include a GUI of a vehicle component such as a CID, a screen of a mobile device 155, or so forth. The GUI can include image data and an overlay. The image data can include transformed image data. The overlay can include any information determined or available to the data processing system 100. For example, the overlay can include a visual object configured to indicate a distance, direction, or other spatial relationship between the coupling member and coupling receiver. The overlay can further provide information, such as a distance, direction, classification, obstacle, authentication status, various prompts disclosed herein, and so forth. The user interface 125 can convey (e.g., via wireless transceivers, over the network 101) image data (e.g., still images or video) or other information such as overlays, prompt, or notifications. The user interface 125 can receive responses, such as confirmations responsive to various outputs or user-initiated docking commands, resumptions from pauses, or so forth. The data processing system 100 can generate control signals based on the information sent or received through the user interface 125, including user input thereto (e.g., confirmations or other selections).

The user interface 125 can provide a notification to a user including a prompt (e.g., prompt for confirmation or other input information, or instructions to perform an operation). The user interface 125 can receive responses to prompts, such as a confirmation of a location of a coupling receiver. For example, the user interface 125 can receive responses from via a mobile device 155, a gesture 140, or an entry to a vehicle component such as a CID.

The data processing system 100 can include or interface with one or more mobile devices 155 associated with a vehicle. The data processing system 100 can communicatively couple to the mobile devices 155 via one or more wired or wireless links of the network 101. Various mobile devices 155 can include various displays configured to present information. For example, some mobile devices 155 can include visual displays such as a screen of a CID or a mobile phone, audio-visual displays such as an output accompanying tones or other audible cues. A mobile device 155 can include haptic or other information. For example, a mobile device can include a key fob, bracelet, or other device lacking a screen.

The user interface 125 can provide notifications to various operations, such as based on a success or failure of an operation. For example, upon a recognition or non-recognition of a gesture 140, instruction, or confirmation, the user interface 125 can provide an indication of receipt, indication of success, or indication of blocking condition (e.g., setting, obstacle, non-identification, or so forth).

The data processing system 100 can include or interface with one or more propulsion systems 160 of a vehicle. The data processing system 100 can communicatively couple to propulsion system 160 via one or more wired or wireless links of the network 101. The propulsion system 160 can include one or more electric motors or other propulsion devices configured to longitudinally propel a vehicle along a driving surface. The propulsion system 160 can further include one or more steering controls (e.g., a steering wheel operatively coupled to a road wheel via a steering column, a rotational to linear actuator such as a rack and pinion connected to a tie rod). The steering controls can adjust a path of travel of the vehicle. The propulsion system 160 can be configured to adjust a height of the coupling member. For example, the height adjustment can include a suspension associated with other portions of the vehicle (e.g., via a chassis thereof). The height adjustment can include an adjustment to an air suspension, hydraulic suspension, adjustable damper systems including height adjustments, or so forth. Height adjustment can be implemented at one or more sprung portions of the vehicle, such as at a rear axle, rear and front axle, or an adjustment particular to a coupling member.

One or more control signals can be associated with one or more portions of a propulsion system 160. For example, a first one or more control signals can correspond to a height adjustment, a second control signal can correspond to a steering angle adjustment, or a third control signal can correspond to a vehicle propulsion. The control signals can be generated by an autonomous or semi-autonomous system. The control signals can be generated by an occupant of a vehicle rotating a steering wheel, providing acceleration inputs to an accelerator or braking pedal or CID (e.g., an adjustment, confirmation, or so forth). The propulsion systems 160 can be operated by a vehicle autonomy system based on control signals received from a mobile device 155, gestures of a user, or other inputs.

Figure 2:
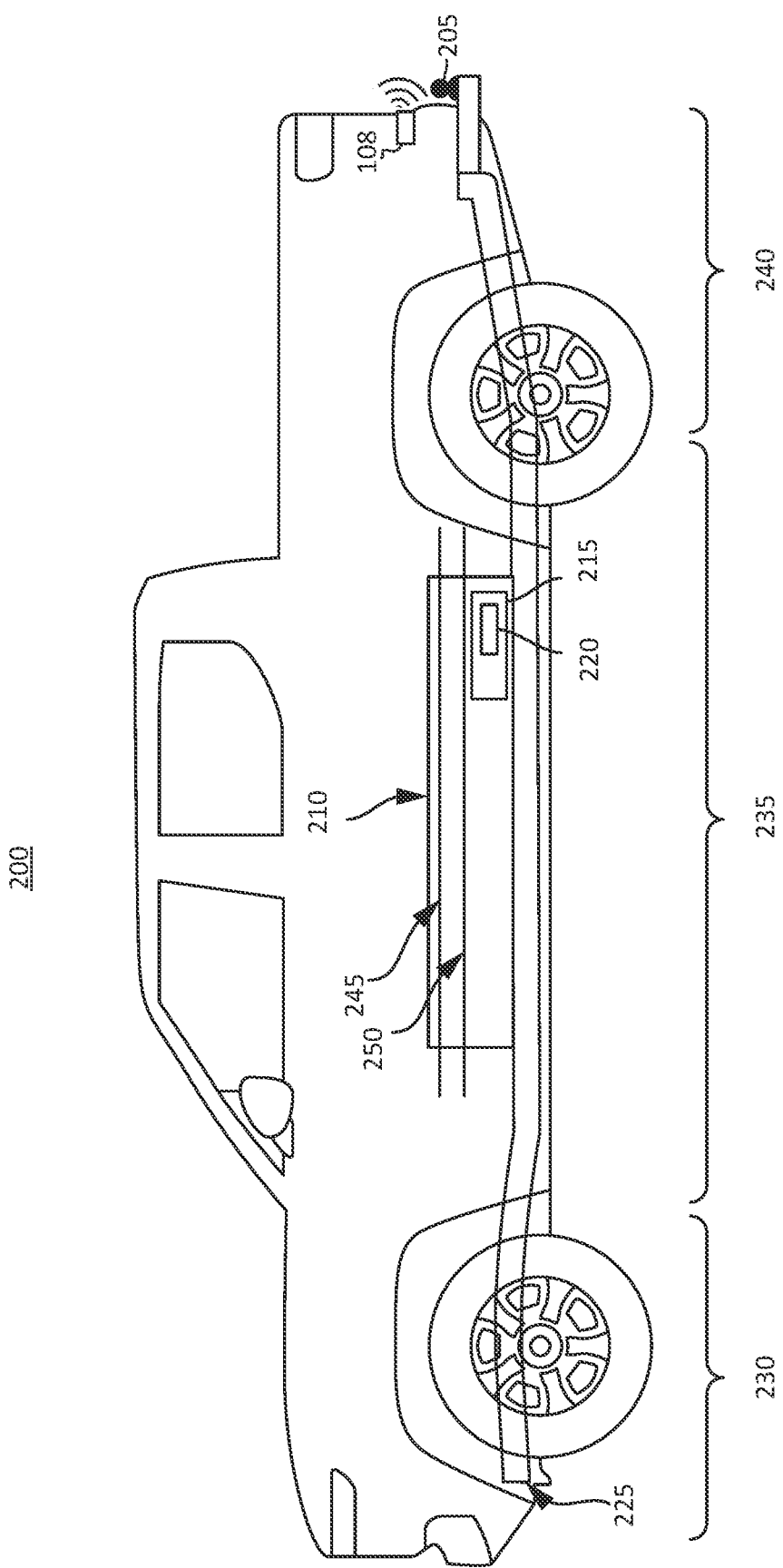
FIG. 2 depicts an electric vehicle, in accordance with some aspects.

FIG. 2 depicts an example cross-sectional view of an electric vehicle 200 installed with at least one battery pack 210. Electric vehicles 200 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 210 can also be used as an energy storage system to power a building, such as a residential home or commercial building. Electric vehicles 200 can be fully electric or partially electric (e.g., plug-in hybrid) and further, electric vehicles 200 can be fully autonomous, partially autonomous, or unmanned. Electric vehicles 200 can also be human operated or non-autonomous. Electric vehicles 200 such as electric trucks or automobiles can include on-board battery packs 210, batteries 215 or battery modules 215, or battery cells 220 to power the electric vehicles.

The electric vehicle 200 can include a chassis 225 (e.g., a frame, internal frame, or support structure). The chassis 225 can support various components of the electric vehicle 200. The chassis 225 can span a front portion 230 (e.g., a hood or bonnet portion), a body portion 235, and a rear portion 240 (e.g., a trunk, payload, or boot portion) of the electric vehicle 200. The chassis 225 can include or couple to a coupling member 205 such as a hitch ball. The coupling member 205 can be configured to couple with a coupling receiver of a towed assembly. For example, the hitch ball can be received into a receiving cavity, and further coupling elements such as chains can be provided to couple the electric vehicle to a trailer or other towed assembly.

The electric vehicle 200 can include or interface with one or more sensors 120 configured to monitor the coupling member 205 or a coupling receiver of a towed assembly. For example, the sensors 120 can include ultrasonics or other time of flight sensor 120 or a camera configured to detect the coupling member 205, coupling receiver or obstacle associated therewith. The sensor 120 can be positioned to detect a human providing a gesture 140, or an obstacle.

The battery pack 210 can be installed or placed within the electric vehicle 200. For example, the battery pack 210 can be installed on the chassis 225 of the electric vehicle 200 within one or more of the front portion 230, the body portion 235, or the rear portion 240. The battery pack 210 can include or connect with at least one busbar, e.g., a current collector element. For example, the first busbar 245 and the second busbar 250 can include electrically conductive material to connect or otherwise electrically couple the battery 215, the battery modules 215, or the battery cells 220 with other electrical components of the electric vehicle 200 to provide electrical power to various systems or components of the electric vehicle 200.

Figure 3:
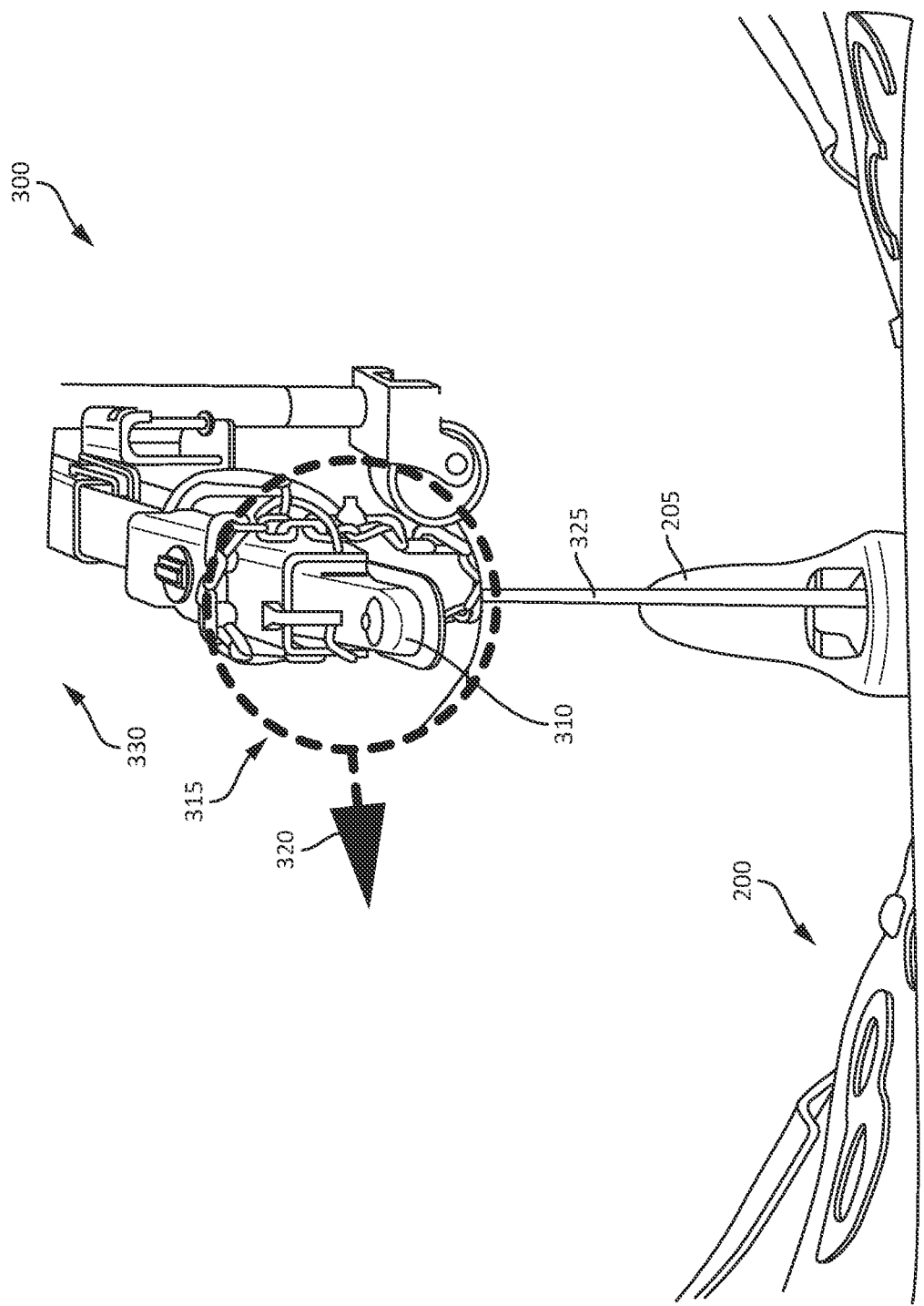
FIG. 3 is a graphical user interface depicting a coupling receiver relative to a coupling member.

FIG. 3 is a graphical user interface 300 depicting a coupling receiver 310 relative to a coupling member 205. The graphical user interface 300 can be presented via a vehicle CID, a mobile device, or another screen. The coupling receiver 310 can correspond to various towable assemblies 330 such as trailers, campers, or other vehicles. The coupling receiver 310 can be configured to interface with a coupling member 205 of the vehicle. The graphical user interface (GUI) 300 can include image data received from an image sensor 120 (e.g., a visible spectrum camera). The presented image data can be transformed to present an isometric, top down, or other view. The graphical user interface 300 can further include an overly including various virtual assets such as an indication of distance 305, a location indicator 315 for the coupling receiver 310, a directional element 320 corresponding to a steering of a vehicle propulsion system, guideline 325 indicating a path to laterally align the coupling member 205 with the coupling receiver 310 or according to a present steering angle, or so forth.

The indication of distance 305 can indicate one or more distances. For example, the distance can include a lateral distance to laterally aligned a center of a hitch ball or other portion of the coupling member 205 with a center of a portion of the coupling receiver 310 configured to couple therewith. A distance can include an indication of a vertical distance, such as a binary indication that the coupling member 205 will or will not collide with the coupling receiver 310, or a distance between the coupling member 205 and the coupling receiver 310 (e.g., between an upper surface of the coupling member 205 and a lower surface of the coupling receiver 310 in a coupled or uncoupled state). A distance can include a straight line or other distance. The data processing system 100 can determine the distance based on the image data from a camera or another source (e.g., ultrasonic data). The location of the coupling receiver 310 can be determined via sensor data. The location of the coupling member 205 can be determined via sensor data or according to vehicle calibration. For example, the vehicle can be calibrated to determine a location of the hitch, whereupon a location of other objects can be determined based on or with reference to such a location.

The location indicator 315 provides an indication of a location. The location indicator 315 can include a bounding box such as a circle surrounding at least a portion of the coupling receiver 310, or can include a highlight, colored presentation, arrow, or other indication of the location of the coupling receiver 310. The GUI 300 can be configured to receive a confirmation or change of the location, or the data processing system 100 can include another input to confirm or adjust a location (e.g., a gesture 140, button press, etc.). The directional element 320 provides a steering input direction to a user to provide a steering control, such as may be affected by a control signal therefor. The directional element 320 can correspond to a steering adjustment for a user, autonomous, or semi-autonomous system. The guideline 325 can provide an indication of a path of travel for the vehicle. For example, according to a present steering angle, a center of the coupling member 205 can proceed along the guideline 325. The virtual assets of the overlay depicted herein are not intended to be limiting. For example, the overlay can further present information associated with an obstacle, a user instruction, a monitored condition, or so forth.

Figure 4:
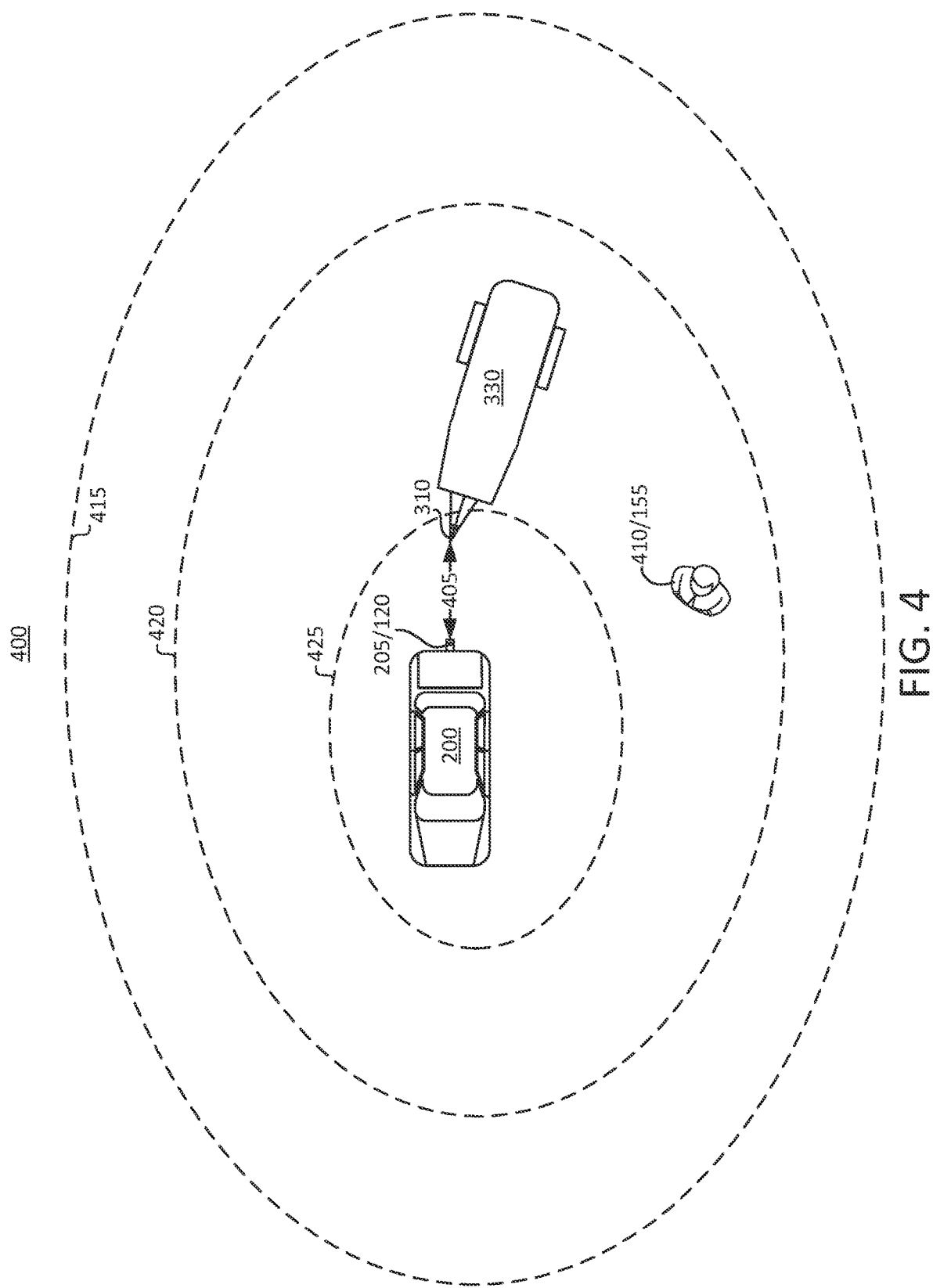
FIG. 4 depicts an environment including a vehicle and a towed assembly, according to some embodiments.

FIG. 4 depicts an environment 400 including a vehicle and a towed assembly 330, according to some embodiments. The vehicle and the towed assembly 330 are depicted as uncoupled from each other. The vehicle is disposed a first distance 405 away from the towed assembly 330, such that the vehicle and the towed assembly 330 are separated by a path of travel. The first distance 405 can be depicted as a vector including a magnitude and a direction. For example, the first distance 405 can include a lateral component including a distance from the vehicle and an indication of an offset according to a vehicle position or steering angle. The first distance 405 can include a vertical component relevant to coupling the coupling member 205 with the coupling receiver 310. The data processing system 100 can determine the first distance 405 or any other distances based on sensor data or user inputs. For example, the data processing system 100 can receive indications of one or more obstacles relevant to vehicle operation and determine a distance thereto.

The environment 400 includes a user 410 along with a mobile device 155. The mobile device 155 can be communicatively coupled with the vehicle (e.g., with a wireless transceiver thereof). The mobile device 155 can include or omit a screen. The wireless transceiver can retrieve digitally encoded information, along with analog information relating to a relative positioning or distance between the mobile device 155 and the vehicle. The user 410 can observe a path of travel between the coupling member 205 and coupling receiver 310, and provide instructions to couple the coupling member 205 with the coupling receiver 310. The conveyance or execution of instructions with the vehicle can be based on a determination that the user is—or is not—within one or more boundaries.

Various boundary lines are depicted corresponding to distances between the user 410 or the mobile device 155 (e.g., according to a detection of the user, or an RSSI associated with the mobile device). Such distances can vary according to antennae orientation, environmental conditions (e.g., humidity), or other objects of the environment (e.g., other people or vehicles). A particular location or distance between the boundary lines can vary according to such conditions. Further, like other figures of the present disclosure, the figures are not presented according to scale, with some dimensions increased or decreased to clearly depict various figures. According to various implementations or environmental conditions, the boundary lines can be varying distances from each other or can overlap.

A first boundary line 415 can indicate a detection distance, wherein the user 410 or the mobile device 155 are detected by the data processing system 100 of the depicted vehicle. For example, a distance from the vehicle to the first boundary line 415 can correspond to a signal to noise ratio or bit error rate of a message conveyed by the mobile device 155 to the data processing system 100 exceeding a threshold.

A second boundary line 420 can correspond to a threshold distance for gesture recognition. For example, the data processing system 100 can determine that a user 410 or a mobile device 155 is within the second boundary line 420 based on a comparison to a threshold (e.g., a visually derived or RSSI based threshold). The data processing system 100 can detect, identify, or receive a gesture 140 based on the comparison to the threshold.

A third boundary line 425 can correspond to another threshold distance for gesture recognition. For example, the data processing system 100 can determine that a user 410 or a mobile device 155 is within the third boundary line 425 based on a comparison to a threshold. The data processing system 100 can inhibit a receipt of body gestures 140 or inhibit an operation of the propulsion system 160, based on the presence of a user 410 or a mobile device 155 within the third boundary line 425. The data processing system 100 can provide an indication of an obstacle to the user interface 125, for presentation. For example, the data processing system 100 can provide haptic feedback to a bracelet, a phone notification, a horn alert, or so forth.

Figure 5:
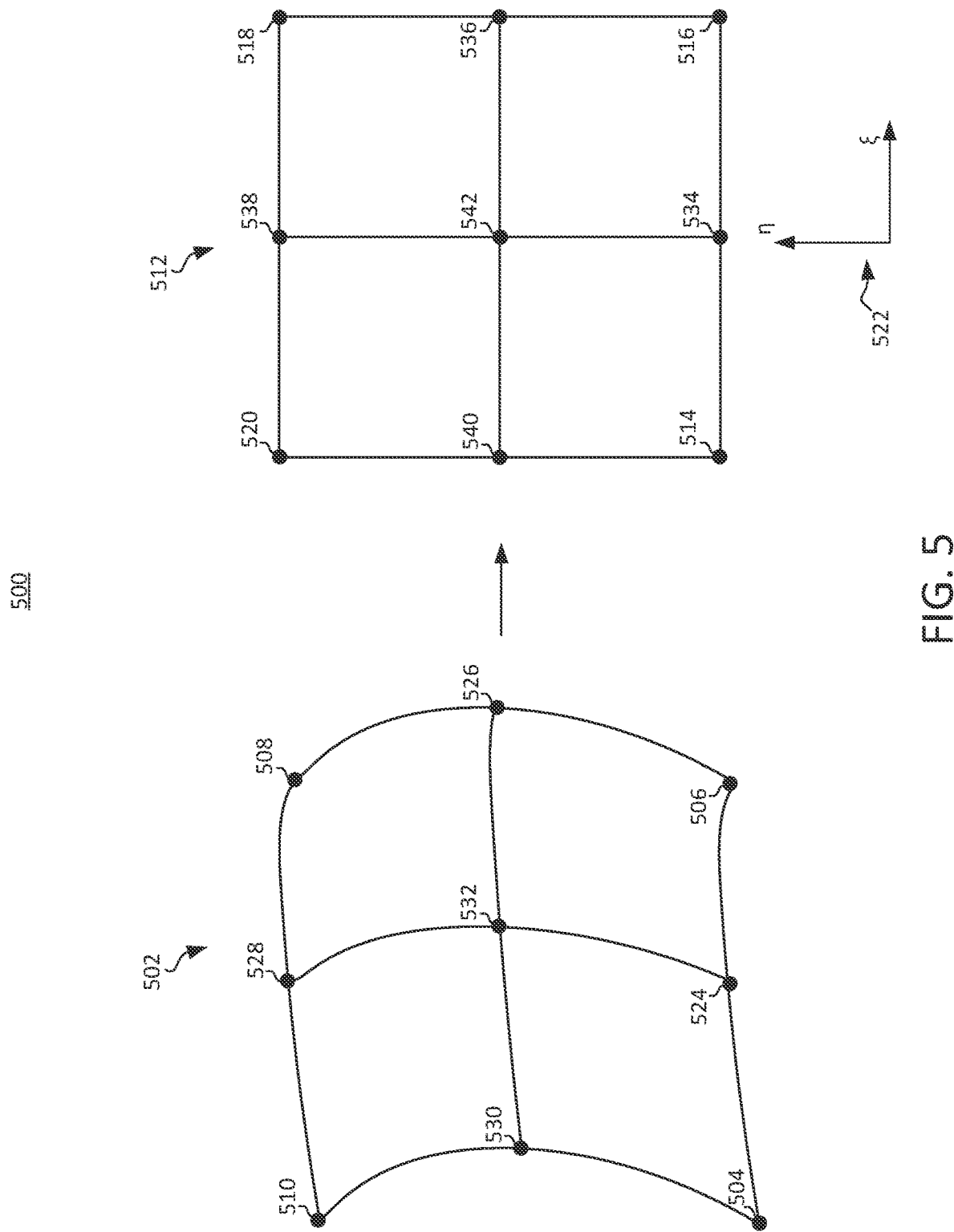
FIG. 5 depicts a visual transform of an image of a rear view camera, according to some embodiments.

FIG. 5 depicts a visual transform 500 of an image of a rear view camera of a vehicle, according to some embodiments. Due to a positioning of the camera and the lens properties, images captured by the camera can be distorted as received. This distorted view can make objects appear skewed or stretched, especially towards the edges. To alleviate this, a non-rigid surface transformation, like the Lagrange transform, can be applied to rectify the image. Particularly, a first grid 502 provides an indication of an image as received from the rear view camera, and can thus appear as a trapezoidal or otherwise according to a deformed shape due to the camera angle. Such a transform can further vary according to an angle or distance 405 between the vehicle and another object, such as a coupling receiver 310 or other portion of a towable assembly 330, or another feature of an image. For example, the image data of FIG. 3 can vary from an isometric view (such as to include portions of the vehicle at lateral extremes thereof). For example, a second grid 512 can be provided according to an isometric view, which can be generated according to the transform.

The transform can include an identification of four pairs of corresponding points between the first grid 502 and the second grid. For example, a first point 504, second point 506, third point 508, and fourth point 510 of the first grid 502 can correspond to a first point 514, second point 516, third point 518, and fourth point 520 of the second grid 512. The points of the first grid 502 can be mapped to the second grid 512 according to a shape transform which can be based on a predefined lens property, along with a steering angle sensor 120 of the steering wheel. For example, each point of the first grid can be transformed to the second grid 512 based on a displacement relative to an axis 522 such as a Lagrangian axis 522 including reference axes of two or more dimensions (e.g., $\xi$, $\eta$, or $\zeta$) Other portions of the image can be transformed according to selected points, such as according to an interpolation or scaling technique.

Use of additional points can reduce interpolation and may improve image quality. For example, the data processing system can map a fifth point 524, sixth point 526, seventh point 528, eighth point 530 and ninth point 532 of the first grid 502 to the second grid 512. Based thereon, along with a steering angle and lens properties, the data processing system 100 can define the fifth point 534, sixth point 536, seventh point 538, eighth point 540 and ninth point 542 of the second grid 512. Image data can be presented according to a mapping of the second grid 512. Additional or fewer points can be included in various implementations or instances.

Figure 6:
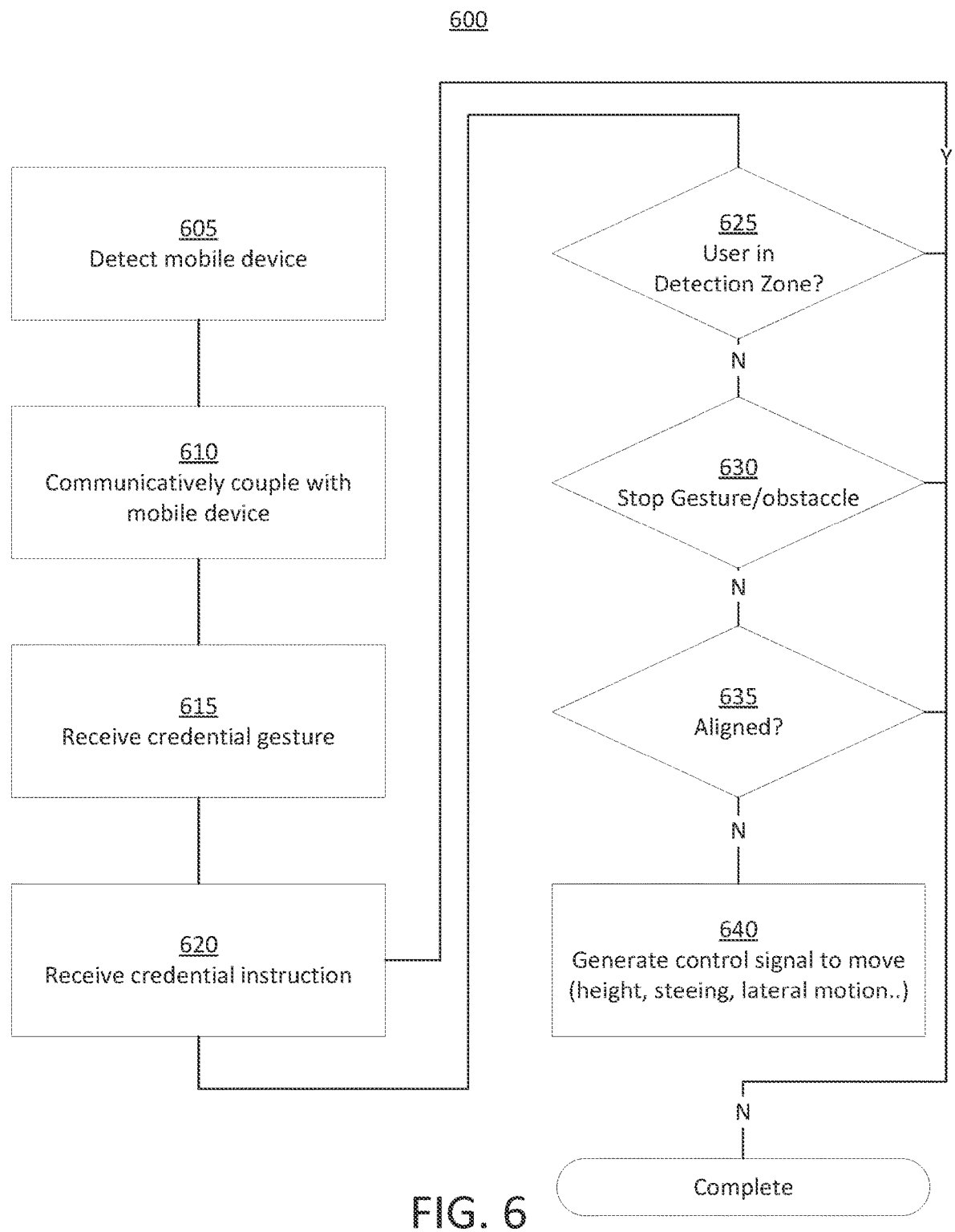
FIG. 6 depicts a flow chart for a method of gesture based vision based hitch docking, according to some embodiments.

FIG. 6 depicts a flow chart for a method 600 of gesture-based vision based hitch docking, according to some embodiments. The method 600 can be performed by one or more systems or components depicted in FIG. 1-4, 10, or 11 including the data processing system 100 of FIG. 1. For example, the method 600 can be performed by one or more controllers of an electric vehicle 200, having a memory device communicatively coupled thereto.

At ACT 605, a data processing system can detect an indication of a user such as a presence of a mobile device 155 or a visual indication. For example, the mobile device 155 can be detected according to an RSSI of a message (e.g., an inquiry request packet of a Bluetooth device, a probe or authentication response of a Wi-Fi STA, or so forth). At ACT 610, the data processing system 100 can communicatively couple to the mobile device 155, such as based on a Bluetooth connection, Wi-Fi association, or other communication protocol. The communicative coupling can be based on a RSSI, which can be a same or different RSSI to determine the mobile device is disposed within a boundary line associated with (e.g., gating) ACT 615. For example, the boundary line can include a boundary line defining a upper or lower RSSI threshold. Some mobile devices 155, such as device employing ASK modulation can perform ACT 605 and ACT 610 concurrently. Indeed, the various methods described herein can be performed in various sequences or some operations can be omitted, substituted, modified, or so forth. For example, communicative coupling with the mobile device 155 can include receiving a credential 145 from the mobile device 155 to determine an identity thereof. Further, ACT 605, ACT 610, or any other operation disclosed herein can correspond to a presentation of an indication corresponding to the operation (e.g., a connection to the mobile device 155, a sensing of the mobile device 155, receipt of a gesture 140, or a result of a threshold comparison) via a user interface 125 (e.g., a haptic, audible, or visual display).

At ACT 615, the data processing system 100 can receive a body gesture 140. The image classifier 110 can classify the body gesture 140. The classification can be compared to a threshold (e.g., a confirmation threshold, which may be predefined or adjustable via a user interface 125). The gesture 140 can encode a credential 145 (e.g., password, personal identification number (PIN), or so forth). For example, the gesture 140 can include an encoding of a sequence of numbers or letters. The gesture 140 (e.g., in combination with a credential 145 received by the mobile device) can identify (e.g., authenticate) the user, whereupon the method 600 can proceed to ACT 620.

At ACT 620, the data processing system 100 can receive a body gesture 140. The gesture 140 of ACT 620 can encode an instruction. For example, a single instruction can correspond to an initiation of hitch docking, or separate gestures 140 can correspond to separate actions (e.g., reversing or advancing the vehicle, adjusting a steering angle, adjusting a height of the coupling member, or so forth).

Referring to ACT 625 or ACT 630, the data processing system 100 can perform checks iteratively or continuously during vehicle operation. For example, at ACT 625, the data processing system 100 can determine that a user is not within a threshold range for gestures 140. The threshold can include an upper threshold (e.g., where the user may be too far to observe the path of the vehicle). The threshold can include an lower threshold (e.g., where the user may impede the path of the vehicle). Such a detection may be according to an RSSI of a mobile device 155 associated with the user. At ACT 630, the data processing system 100 can receive an indication of a blocking condition. For example, the blocking condition can include a gesture 140 to halt the vehicle, an indication, from the condition monitor 105, of a presence of an obstacle, or another input to halt operation (e.g., according to an input from a mobile device 155, an in-cabin control, or another portion of the user interface 125). Responsive to a determination, at ACT 625 or 630, that a user is in detection zone or a blocking condition does not exist, the method 600 can pause or return to ACT 605, or 620, or so forth, along with providing a user notification thereof, via the user interface 125. Responsive to a determination, at ACT 625 or 630, that a user is not in a detection zone or no blocking condition exists (e.g., according to path inspection), the method 600 can proceed to ACT 640, along with providing a user notification thereof, via the user interface 125.

At ACT 635, the data processing system 100 can determine that that the coupling member 205 is aligned with the coupling receiver 310. For example, the alignment can be along a same lateral plane of the vehicle, wherein the coupling member 205 is disposed below the coupling receiver 310 or otherwise configured to couple thereto, according to various coupling member 205 or coupling receiver 310 geometries. Responsive to a determination of alignment, the method 600 can proceed to ACT 620, 605, or so forth, or proceed to a termination of the method. Responsive to a determination of non-alignment, the method can proceed to ACT 640.

At ACT 640, the data processing system 100 can generate control signal to move the vehicle. For example, the control signals can cause the propulsion system 160 to propel the vehicle, adjust a height of the vehicle, or adjust a steering input for one or more wheels of the vehicle. The data processing system 100 can further generate a notification from the user interface 125, such as the mobile device, or user interfaces 125 of the vehicle such as a horn, reverse tone, hazard lights, CID, or so forth.

Figure 7:
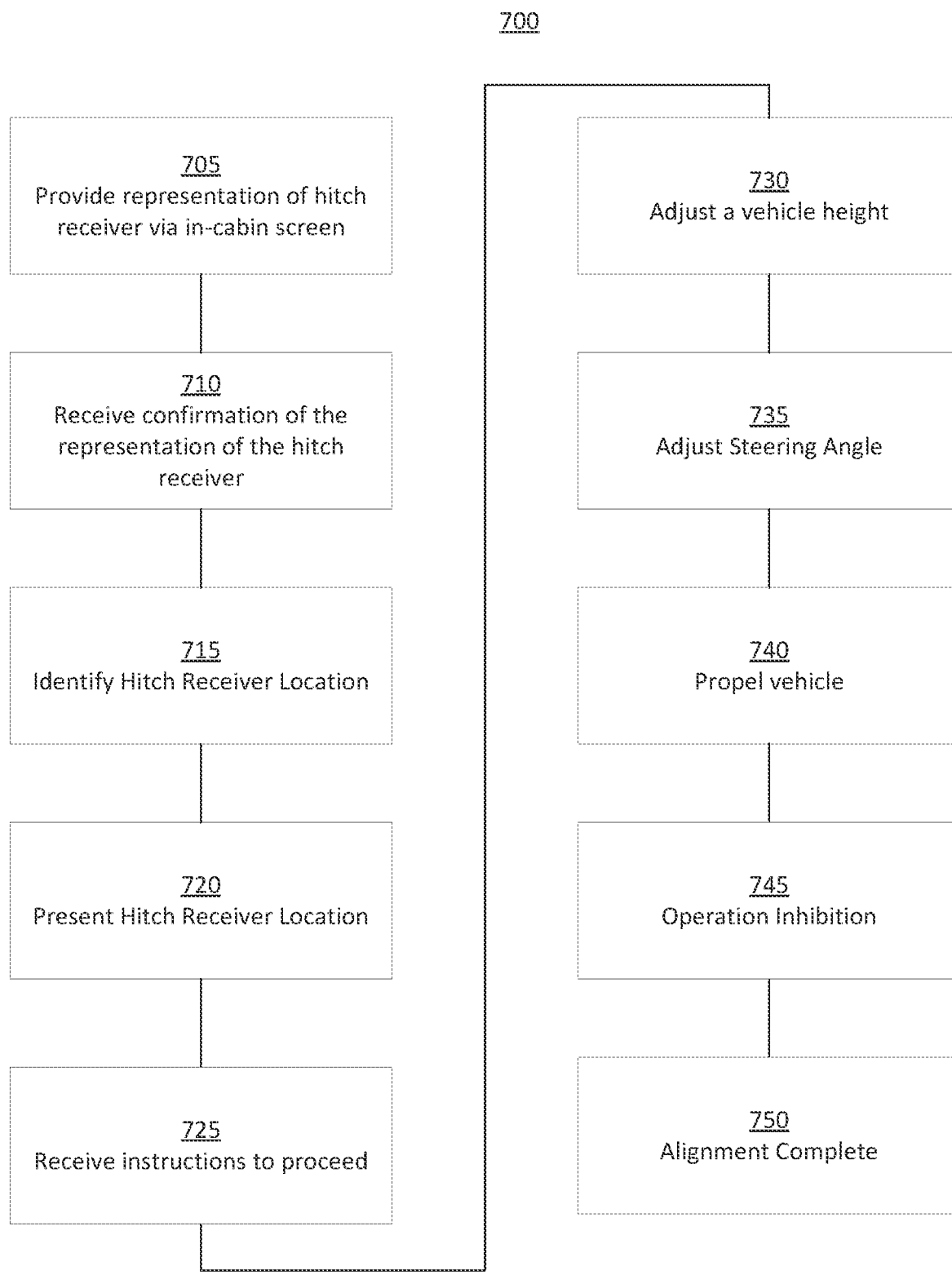
FIG. 7 depicts a flow chart for a method of in-cabin vision based hitch docking, according to some embodiments.

FIG. 7 depicts a flow chart for a method 700 of in-cabin vision based hitch docking, according to some embodiments. The method 700 can be performed by one or more systems or components depicted in FIG. 1-4, 10, or 11 including the data processing system 100 of FIG. 1. For example, the method 700 can be performed by one or more controllers of an electric vehicle 200, having a memory device communicatively coupled thereto.

At ACT 705, the data processing system 100 can provide a representation of a coupling receiver 310 to an occupant of a vehicle. For example, the representation can indicate a location of a towed assembly, or a coupling receiver 310 thereof. The representation can be provided responsive to a condition of the electric vehicle 200. For example, the representation can be provided responsive to a determination that a gear selector lever is in a reverse position, that a vehicle is occupied, or that an object is located in a field of view of a sensor 120 of the vehicle. The representation can be presented responsive to an automated process based on one or more conditions sensed by the data processing system 100 (e.g., the condition monitor 105), or a user selection at ACT 710. With continued reference to ACT 710, the data processing system can receive a confirmation of a coupling receiver 310 in a field of view of a sensor 120. The representation of the coupling receiver 310 can be responsive to a user selection of assisted docking via any portion of the user interface 125 (e.g., a touchscreen or other control of a CID). The user selection can include a selection of the coupling receiver 310 or a dedicated control. That is, the receipt of a confirmation of a presence of the coupling receiver 310 can precede or follow the representation of the hitch, at ACT 705.

At ACT 715, the data processing system 100 can identify the coupling receiver 310 according to the representation thereof. The identification of the coupling receiver 310 can include an identification of a coupling receiver 310 type, distance, or other characteristics. For example, the image classifier 110 can classify the coupler and compare a confidence associated with the classification to a threshold. A ToF or other sensor 120 can identify a distance between the coupling member 205 and the coupling receiver 310. Based on a comparison of the confidence of the classification to the threshold or the distance, the method can proceed to ACT 720. For example, responsive to a determination that the confidence exceeds the threshold, the data processing system 100 can present the coupling receiver location with elevated prominence, relative to other image features (e.g., by provision of a visual indication including an overlay object). Responsive to a determination that the confidence does not exceed the threshold, the data processing system 100 can prompt further information, or depict an estimated coupling receiver location.

At ACT 720, the data processing system 100 can present the coupling receiver location according to a graphical representation thereof. For example, the representation can indicate a lateral distance or height distance. The representation of the coupling receiver 310 can include a highlighted or otherwise indicated portion (e.g., according to an indicator, such as the indication 315 of FIG. 3). The representation of the coupling receiver 310 can be provided with a prompt, such as a prompt to confirm a depicted location of the coupling receiver 310, or to select or confirm a presence of the coupling receiver 310 via selection of a location of the coupling receiver 310 on a display screen. The representation can include a guideline 325 relative to the vehicle, or an indication of a directional element 320 between the coupling member 205 and the coupling receiver 310. For example, the directional element 320 can indicate a direction relative to a present position of the vehicle, or based on a steering angle of the vehicle. The directional element 320 can provide an instruction corresponding to an input (e.g., a steering angle adjustment, positional adjustment via propulsion, or height adjustment).

At ACT 725, the data processing system 100 can receive an instruction to proceed. For example, the instruction can be received from an CID control (e.g., a touchscreen or button associated therewith). The confirmation can accept a depicted location outline for a location of the hitch receiver (e.g. according to a circle or other closed shape or approximation thereof provided to an CID, the shape bounding the coupling receiver 310). The confirmation can confirm a distance or directionality between the coupling member 205 and the coupling receiver 310. The method 700 can include various receipts of instructions to proceed. For example, the data processing system can present additional or fewer prompts for instructions or confirmations. For example, the method 700 can include additional confirmations within or between ACT 730, ACT 735, or ACT 740, or can omit ACT 710 or ACT 725. The instructions can include an acknowledgement through a touchscreen or control of the CID, or according to another vehicle control. For example, the instructions can include a selection of a reverse gear, removing pressure from a brake pedal, or so forth.

At ACT 730, ACT 735, and ACT 740, the data processing system 100 can cause the propulsion system 160 of the vehicle to perform various adjustments. ACT 730, ACT 735, or ACT 740 can include autonomous operation (e.g., without user input) or semi-autonomous operation. The semi-autonomous operation can include providing adjustments based on an acceptance of a user input or a presentation of an instruction for vehicle operation (e.g., a steering wheel rotation, accelerator application, or so forth). ACT 730, ACT 735, or ACT 740 can be performed sequentially, iteratively, or simultaneously based on an environment and distance between the coupling member 205 and coupling receiver 310. For example, in one instance, the data processing system 100 can adjust a vehicle height at ACT 730 to cause an upper surface of a coupling member 205 to be disposed below a lower surface of a coupling receiver 310, and thereafter provide a prompt for a user to confirm the height. Subsequent to a receipt of a confirmation responsive to the prompt, the method 700 can proceed to ACT 735 to adjust steering, and to ACT 740 to propel the vehicle to adjust the vehicle position by engaging an electric motor or other drivetrain component.

Prior to, during, or between ACT 730, ACT 735, or ACT 740, the data processing system 100 can monitor for a condition indicative of an inhibition of vehicle operation. For example, the data processing system 100 can monitor for an obstacle in the path of the vehicle, a suspension adjustment limit, or a user input. The data processing system 100 can further monitor a displacement between the coupling member 205 and the coupling receiver 310. For example, based on such monitoring, the method can proceed to ACT 745, 750, another operation such as another of ACT 730, ACT 735, ACT 740, or request further instructions to proceed (e.g., at ACT 725).

Referring now to ACT 745, the data processing system 100 can receive a condition to inhibit vehicle operation. For example, the condition can include a presence of an obstacle or a user input. The user input can include a user input from an in cabin display such as the CID or from a component of the user interface 125 disposed exterior to the vehicle (e.g., a body gesture 140). Responsive to a detection of the condition, the data processing system 100 can halt an adjustment to steering, propulsion, or so forth. The data processing system 100 can cause a display of instructions to a user (e.g., to raise a coupling receiver 310 responsive to a determination that the travel limit for a suspension limit will not position the coupling member 205 below the coupling receiver 310).

Referring now to ACT 750, the data processing system 100 can determine that the coupling member 205 is aligned with the coupling receiver 310. For example, that a hitch ball is disposed under a receiving cavity therefor. Thereafter, the coupling member 205 can couple with the coupling receiver 310, such as by raising the coupling member 205 (e.g., via the vehicle suspension), or lowering the coupling receiver 310 (e.g., via a tongue jack of a towable assembly 330). Such coupling can be performed by the data processing system 100, or by a user. For example, a user can couple chains, turn indicator or brake light connections, or so forth.

Figure 8:
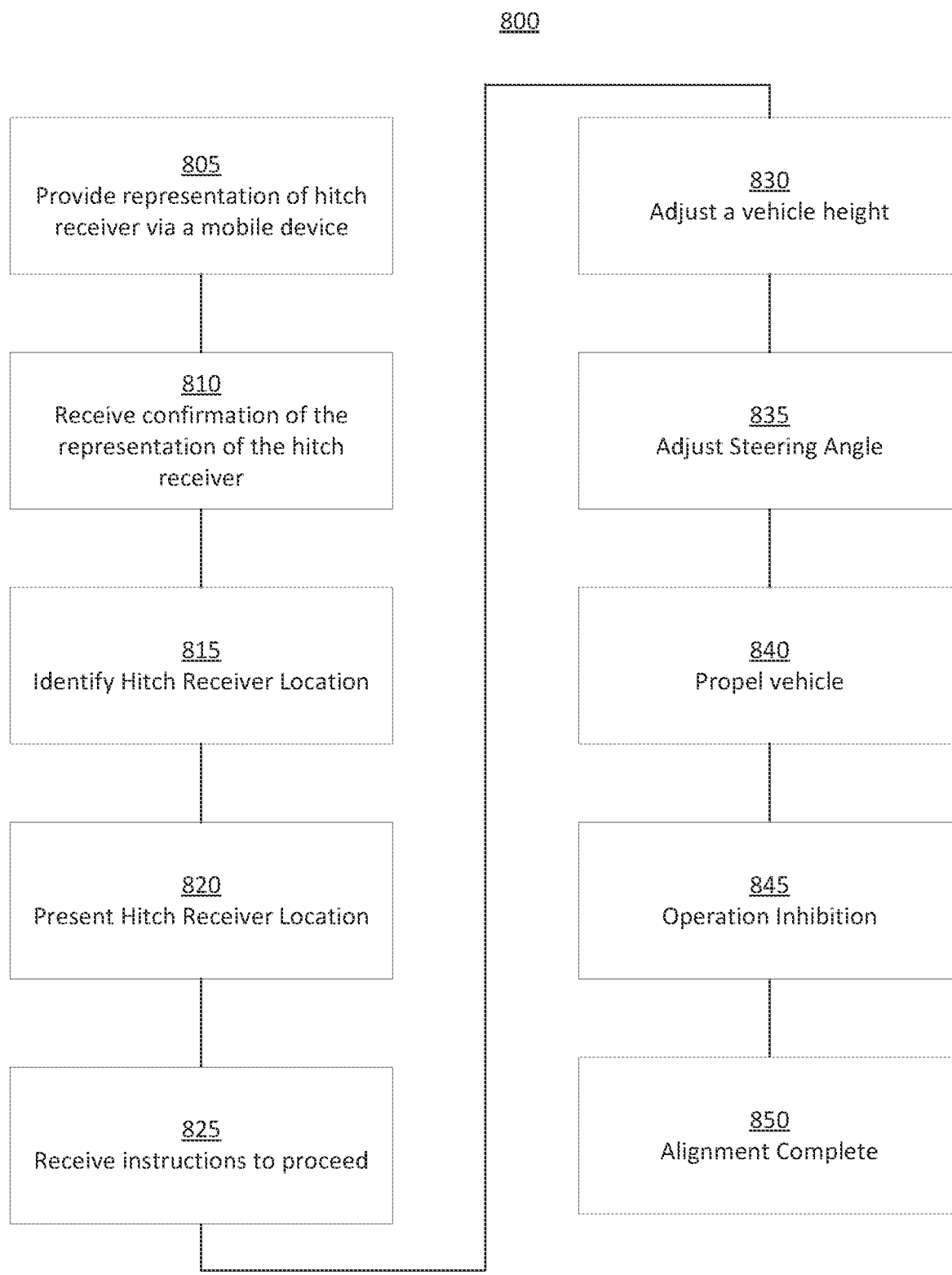
FIG. 8 depicts a flow chart for a method of mobile device vision based hitch docking, according to some embodiments.

FIG. 8 depicts a flow chart for a method 800 of mobile device 155 vision based hitch docking, according to some embodiments. The method 800 can be performed by one or more systems or components depicted in FIG. 1-4, 10, or 11 including the data processing system 100 of FIG. 1. For example, the method 800 can be performed by one or more controllers of an electric vehicle 200, having a memory device communicatively coupled thereto.

The various operations of the method 800 can include operations corresponding to the method 700 of FIG. 7. For example, as provided herein, the various operations of the method 700 of FIG. 7 can be adapted for execution with respect to a mobile device 155. Merely for brevity, some ACTs will be briefly described with regard to FIG. 8, however, the ACTs provided henceforth can inherit, duplicate, or adapt various aspects described at FIG. 7 and elsewhere according to the present disclosure. The mobile device 155 can include a screen to display information presented to an in-cabin display referred to with respect to the method 700 of FIG. 7. By presenting the information to a user exterior to the vehicle, a user can directly observe the spatial relationship between the coupling member and coupling receiver, or can perform other tasks associated with coupling (e.g., connecting chains, adjusting a tongue height, advancing a winch to adjust a position of a boat on the trailer, etc.). The user can provide various instructions, credentials 145, or so forth via the mobile device 155, along with gestures 140 or other inputs. That is, various operations can be duplicated or substituted between method 600 of FIG. 6, method 700 of FIG. 7, method 800 of FIG. 8, or otherwise provided according to the present disclosure.

At ACT 805, the data processing system 100 can provide a representation of a coupling receiver 310 to a user interface 125 of a mobile device 155. The mobile device 155 can be disposed interior to a vehicle cabin or exterior to the vehicle. At ACT 810, the data processing system 100 can receive a confirmation of a coupling receiver 310 in a field of view of a sensor 120, such as from an entry to the mobile device 155. At ACT 815, the data processing system 100 can identify the coupling receiver 310 according to the representation thereof. At ACT 820, the data processing system 100 can present the coupling receiver 310 location according to a graphical representation thereof, such as via a display screen of the mobile device 155.

At ACT 825, the data processing system 100 can receive an instruction to proceed, via the mobile device 155. At ACT 830, ACT 835, and ACT 840, the data processing system 100 can cause the propulsion system 160 of the vehicle to perform various adjustments. Particularly, at ACT 830, the data processing system 100 can generate control signals to adjust a vehicle height; at ACT 835, the data processing system 100 can generate control signals to adjust a steering angle; at ACT 840, the data processing system 100 can generate control signals to propel the vehicle. Any of the control signals can be generated incident to confirmations, selections, or other information received from a mobile device 155.

At ACT 845, the data processing system 100 can receive a condition to inhibit vehicle operation. For example, the condition can be received from the mobile device 155, with respect to the mobile device (e.g., a location thereof, which as a location violative of an upper or lower threshold), or based on a vehicle sensor 120 (e.g., a condition of the vehicle determined by the condition monitor 105 based on sensor data). The method can proceed from any ACT to ACT 845 upon a detection of the inhibiting condition, and proceed from ACT 845 to same act entered from, or another ACT (e.g., can automatically resume operation, or provide a prompt for confirmation of resumption). At ACT 850, the data processing system 100 can determine that the coupling member 205 is aligned with the coupling receiver 310, and complete operation. The data processing system 100 can provide an indication of completion such as to the mobile device 155, by flashing lights, or so forth.

FIG. 9 depicts a flow chart for a method 900 of vision based hitch docking, according to some embodiments. The method 900 can be performed by one or more systems or components depicted in FIG. 1-4, 10, or 11 including the data processing system 100 of FIG. 1. For example, the method 900 can be performed by one or more controllers of an electric vehicle 200, having a memory device communicatively coupled thereto. At ACT 905, the data processing system 100 can detect a location of a coupling receiver of a towed assembly configured to interface with a coupling member 205 of a vehicle, the location based on image data associated with a camera of the vehicle. The detection can be based on a user input, such as a selection of a docking mode, a received gesture 140, or a monitored condition, such a selection of a reversal gear in combination with an obstacle behind the vehicle (e.g., where the obstacle can include a towable assembly 330).

At ACT 910, the data processing system 100 can present the location via an interface. The presentation can include an indication via a screen including image data, an overlay, or so forth. The presentation can include an indication via a haptic cue, light flashing, reverse tone or horn, or so forth.

For example, the presentation can include a predefined output corresponding to a proceedance or inhibiting condition associated with the method 900 (e.g., one or two haptic cues, a long or short haptic cue, a haptic cue provided with or without a simultaneous illuminating of vehicle lights, etc.). Outputs can correspond to one or more conditions. For example, a same output can correspond to a detection of an obstacle, an indication that a tongue height should be adjusted, or that a user is too close or too far to proceed with an operation. A first output (e.g., a haptic buzz or light) can be provided along with a further output such as a notification to a mobile device 155 providing additional details. Thus, a user can receive an indication that an obstacle blocks vehicle travel. Wherein the occupant observes the obstacle, they may cause the vehicle to approach the towable assembly 330 from another direction (e.g., a path of travel including forward propulsion and subsequent rearward propulsion). Wherein the user does not observe the obstacle (e.g., a lens smudge of a camera), they can retrieve a mobile device 155, or enter a vehicle to observe and remedy the obstacle.

At ACT 915, the data processing system 100 can receive, from the interface, a confirmation of the location. The receipt can include a receipt of a gesture 140 via a camera or other sensor 120, a confirmation by a CID or mobile device 155 control, or so forth. At ACT 920, the data processing system 100 can generate a control signal based on the confirmation, the control signal to adjust a position of the coupling member. The adjustment can include one or more adjustments to a height, steering angle, or longitudinal position.

Figure 10:
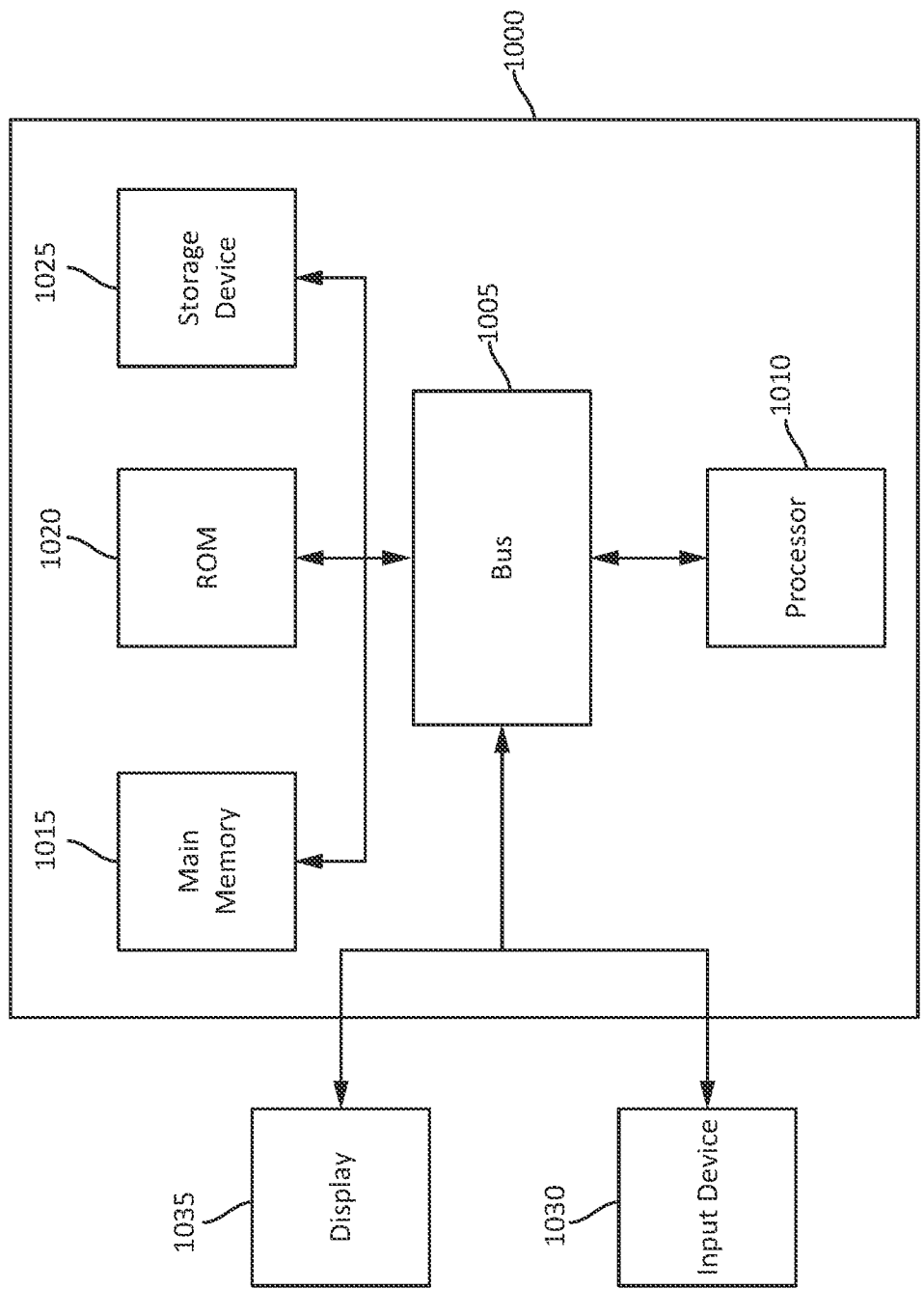
FIG. 10 is a block diagram illustrating an architecture for a computer system that can be employed to implement elements of the systems and methods described and illustrated herein.

FIG. 10 depicts an example block diagram of an example computer system 1000. The computer system or computing device 1000 can include or be used to implement a data processing system 100 or its components. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 1000 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 1000 may be coupled via the bus 1005 to a display 1035, such as a liquid crystal display, or active matrix display, for displaying information to a user such as a user disposed within a cabin of an electric vehicle 200 or exterior to the cabin. An input device 1030, such as a button or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Figure 11:
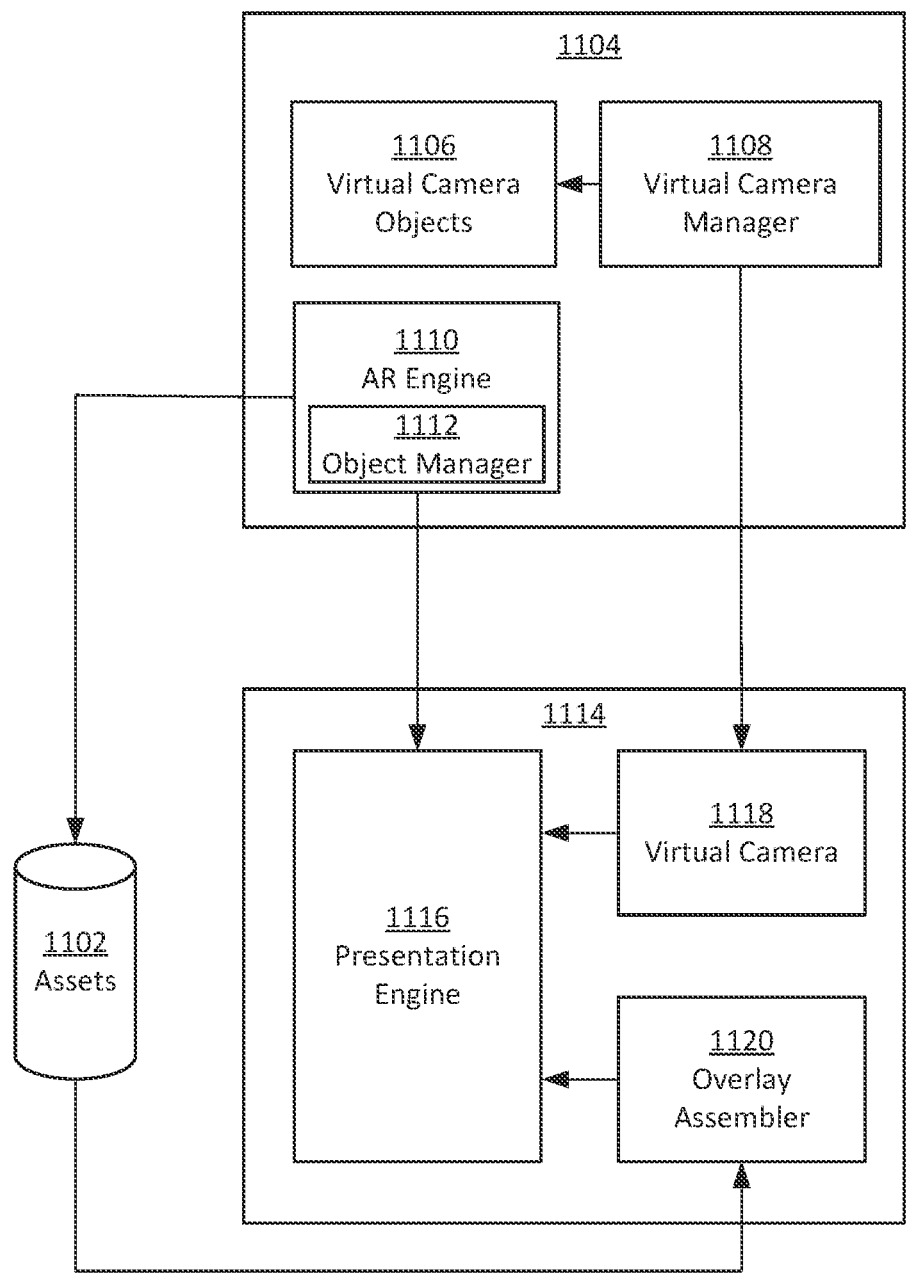
FIG. 11 is a block diagram illustrating an architecture for a computer system that can be employed to implement elements of the systems and methods described and illustrated herein.

FIG. 11 is a block diagram 1100 illustrating an example architecture for a computer system 1000 that can be employed to implement elements of the systems and methods described or illustrated herein. The computer system can include an asset repository 1102 including various assets. The assets can be configured for assemblage according to an overlay assembler 1120 of a presentation layer 1114, wherein the overlay assembler 1120 generates overlays including one or more virtual assets (e.g., the guideline 325, directional element 320, or other virtual assets). A presentation engine 1116 can generate an output including the overlay along with a video feed (e.g., by flattening an overlay layer and input layer to generate an output). The presentation engine 1116 can convey the output to a vehicle CID, a mobile phone or other mobile device 155, or another screen of a user interface 125.

An application layer 1104 can include a virtual camera manager 1108 to generate outputs for a virtual camera 1118 of the presentation layer 1114, such as to provide windows for gesture 140 input, windows for presentation (e.g., to the CID or mobile device, or so forth). For example, the window can be provided responsive to a detection of an obstacle such as a coupling receiver 310. The application layer 1104 can include an augmented reality (AR) engine 1110 including an object manager 1112 to provide or select the assets for presentation. Further, at the application layer 1104, virtual camera objects 1106 can be selectable via a touchscreen or other input, such as to confirm a location of a coupling receiver 310.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors 120 providing any value determined herein, sensors 120 providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, ele- ments and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method, comprising:
   classifying, by one or more processors, a coupling receiver as a type of a plurality of types based on image data received from a camera of a vehicle, the plurality of types comprising a lunette ring, a gooseneck hitch, and a ball coupler;
   determining, by the one or more processors, that the classification of the type of coupling receiver is within a first threshold;
   detecting, by the one or more processors based on the type of coupling receiver, a location of the coupling receiver of a towed assembly configured to interface with a coupling member of the vehicle;
   presenting, by the one or more processors, the location via an interface;
   receiving, by the one or more processors, from the interface, a confirmation of the location;
   determining, by the one or more processors, a boundary corresponding to a second threshold corresponding to a threshold distance from the vehicle for gesture recognition;
   detecting, by the one or more processors, a body gesture of a user;
   determining, by the one or more processors, that the user is positioned within the threshold distance from the vehicle for gesture recognition; and
   generating, by the one or more processors, a control signal based on the confirmation and based on a recognition of the detected body gesture from the user positioned within the threshold distance, the control signal to adjust a position of the coupling member.

2. The method of claim 1, comprising:
   determining, by the one or more processors, a selected direction of travel for the vehicle; and
   identifying, by the one or more processors, the coupling receiver based on a classification of a segmented portion of the image data, the detection of the location responsive to the determination of the direction of travel and the identification of the coupling receiver.

3. The method of claim 1, comprising:
   detecting, by the one or more processors, an indication of a presence of the user exterior to the vehicle;
   comparing, by the one or more processors, the indication of the presence to the second threshold;
   determining, by the one or more processors, based upon a receipt of a token, an identity of the user;

detecting, by the one or more processors, the body gesture corresponding to the control signal;
associating, by the one or more processors, a path of travel with the adjustment to the position of the coupling member;
inspecting, by the one or more processors, the path of travel for an obstacle; and
generating, by the one or more processors, the control signal based on the inspection of the path of travel.

4. The method of claim 1, wherein generating the control signals to adjust the location of the coupling receiver comprises:
generating, by the one or more processors, a first control signal to adjust a height of the coupling member;
generating, by the one or more processors, a second control signal to adjust a steering angle of a propulsion system of the vehicle; and
generating, by the one or more processors, a third control signal to propel the vehicle.

5. The method of claim 1, comprising:
credentialling, by the one or more processors, the user based on a message received from a mobile device exterior to the vehicle,
wherein the interface comprises the mobile device; and
the control signal is generated based on the credentialling.

6. The method of claim 1, comprising:
generating, by the one or more processors, a visual object configured to indicate a spatial relationship between the coupling member and the coupling receiver;
transmitting, by the one or more processors, the image data and the visual object, to a mobile device exterior to the vehicle;
receiving, by the one or more processors from the mobile device, the confirmation of the location; and
generating, by the one or more processors, the control signal based on the confirmation.

7. The method of claim 1, comprising:
detecting, by the one or more processors via a time-of-flight sensor, an obstacle along a path of travel of the vehicle.

8. The method of claim 1, comprising:
receiving, by the one or more processors, first image data from the camera;
receiving, by the one or more processors from a propulsion system of the vehicle, a steering angle;
transforming, by the one or more processors based on the steering angle, the first image data to generate second image data; and
presenting, by the one or more processors via the interface, an indication of the location overlaying the second image data.

9. The method of claim 1, wherein the detection of the location of the coupling receiver is based on an identification of the coupling receiver, based on the image data.

10. A system comprising:
a computing system comprising one or more processors, coupled with memory to:
classify a coupling receiver as a type of a plurality of types based on image data received from a camera of a vehicle, the plurality of types comprising a lunette ring, a gooseneck hitch, and a ball coupler;
determine that the classification of the type of coupling receiver is within a threshold;
detect, based on the type of coupling receiver, a location of the coupling receiver of a towed assembly configured to interface with a coupling member of the vehicle;
present the location via an interface;
receive, from the interface, a confirmation of the location;
determine a boundary corresponding to a second threshold corresponding to a threshold distance from the vehicle for gesture recognition;
detect a body gesture of a user;
determine that the user is positioned within the threshold distance from the vehicle for gesture recognition; and
generate a control signal based on the confirmation and based on a recognition of the detected body gesture from the user positioned within the threshold distance, the control signal to adjust a position of the coupling member.

11. The system of claim 10, comprising the one or more processors to:
determine a selected direction of travel for the vehicle; and
identify the coupling receiver based on a classification of a segmented portion of the image data, the detection of the location responsive to the determination of the direction of travel and the identification of the coupling receiver.

12. The system of claim 10, comprising the one or more processors to:
detect an indication of a presence of the user exterior to the vehicle;
compare the indication of the presence to the second threshold;
determine, based upon a receipt of a token, an identity of the user;
detect the body gesture corresponding to the control signal;
associate a path of travel with the adjustment to the position of the coupling member;
inspect the path of travel for an obstacle; and
generate the control signal based on the inspection of the path of travel.

13. The system of claim 10, comprising the one or more processors to:
generate a first control signal to adjust a height of the coupling member;
generate a second control signal to adjust a steering angle of a propulsion system of the vehicle; and
generate a third control signal to cause the propulsion system to generate tractive effort.

14. The system of claim 10, comprising the one or more processors to:
credential the user, based on a message received from a mobile device exterior to the vehicle,
wherein the interface comprises the mobile device; and
the control signal is generated based on the credentialling.

15. The system of claim 10, comprising the one or more processors to:
generate a visual object configured to indicate a spatial relationship between the coupling member and the coupling receiver;
transmit the image data and the visual object, to a mobile device exterior to the vehicle;
receive, from the mobile device, the confirmation of the location; and
generate the control signal based on the confirmation.

16. The system of claim 10, comprising the one or more processors to:
detect, via a time-of-flight sensor, an obstacle along a path of travel of the vehicle, wherein the location of the coupling receiver is detected responsive to the detection of the obstacle.

17. The system of claim 10, comprising the one or more processors to:
  receive first image data from the camera;
  receive, from a propulsion system of the vehicle, a steering angle;
  transform, based on the steering angle, the first image data to generate second image data; and
  present, via the interface, an indication of the location overlaying the second image data.

18. An electric vehicle comprising:
  a coupling member;
  a propulsion system configured to adjust a position, and height of the coupling member; and
  a computing system comprising one or more processors, coupled with memory, to:
    classify a coupling receiver as a type of a plurality of types based on image data received from a camera of the vehicle, the plurality of types comprising a lunette ring, a gooseneck hitch, and a ball coupler;
    determine that the classification of the type of coupling receiver is within a threshold;
    detect a location of the coupling receiver of a towed assembly configured to interface with the coupling member of the vehicle, the location based on image data associated with a camera of the vehicle;
    present the location via an interface;
    receive, from the interface, a confirmation of the location;
    determine a boundary corresponding to a second threshold corresponding to a threshold distance from the vehicle for gesture recognition;
    detect a body gesture of a user;
    determine that the user is positioned within the threshold distance from the vehicle for gesture recognition; and
    generate a plurality of control signals to adjust the position of the coupling member based on the confirmation and based on a recognition of the detected body gesture from the user positioned within the threshold distance, the control signals comprising:
      a first control signal to adjust the height of the coupling member;
      a second control signal to adjust a steering angle of the vehicle; and
      a third control signal to propel the vehicle.

19. The electric vehicle of claim 18, comprising the computing system to:
  detect an indication of a presence of the user exterior to the vehicle;
  compare the indication of the presence to the second threshold;
  determine based upon a receipt of a token, an identity of the user;
  detect the body gesture corresponding to at least one of the plurality of control signals;
  associate a path of travel with the adjustment to the position of the coupling member;
  inspect the path of travel for an obstacle; and
  generate the control signal based on the inspection of the path of travel.

20. The electric vehicle of claim 18, comprising the computing system to:
  generate a visual object configured to indicate a spatial relationship between the coupling member and the coupling receiver;
  transmit the image data and the visual object, to a mobile device exterior to the vehicle;
  receive, from the mobile device, the confirmation of the location; and
  generate the control signal based on the confirmation.

* * * * *